US010648208B2

(12) United States Patent
Eickhoff (10) Patent No.: US 10,648,208 B2
(45) Date of Patent: *May 12, 2020

(54) DOOR CLOSER COMMUNICATION

(71) Applicant: Schlage Lock Company LLC, Carmel, IN (US)

(72) Inventor: Brian C. Eickhoff, Danville, IN (US)

(73) Assignee: Schlage Lock Company LLC, Carmel, IN (US)

(*) Notice: Subject to any disclaimer, the term of this patent is extended or adjusted under 35 U.S.C. 154(b) by 0 days.

This patent is subject to a terminal disclaimer.

(21) Appl. No.: 16/103,460

(22) Filed: Aug. 14, 2018

(65) Prior Publication Data

US 2019/0145138 A1 May 16, 2019

Related U.S. Application Data

(63) Continuation of application No. 15/594,963, filed on May 15, 2017, now Pat. No. 10,047,551.

(Continued)

(51) Int. Cl.
*E05C 17/56* (2006.01)
*E05F 3/04* (2006.01)
(Continued)

(52) U.S. Cl.
CPC .............. *E05C 17/56* (2013.01); *E05F 3/04* (2013.01); *E05F 15/40* (2015.01); *E05F 15/70* (2015.01);
(Continued)

(58) Field of Classification Search
CPC ..................................... E05C 17/56; E05F 15/40; E05F 15/70; E05F 3/04; G07C 9/00174
See application file for complete search history.

(56) References Cited

U.S. PATENT DOCUMENTS 5,866,999 A 2/1999 Schmelzer et al.
5,878,530 A 3/1999 Eccleston
(Continued)

FOREIGN PATENT DOCUMENTS

DE 102010030304 A1 12/2011

OTHER PUBLICATIONS

International Search Report; International Searching Authority; International Patent Application No. PCT/US2017/032639; dated Aug. 1, 2017; 3 pages.

(Continued)

*Primary Examiner* — Nabil H Syed
(74) *Attorney, Agent, or Firm* — Taft Stettinius & Hollister LLP (57) ABSTRACT

A door closer system having a door closer that includes at least one sensor configured to sense an operating characteristic or condition relating to the door closer including a position or speed of displacement of at least a portion of the door closer or an associated entryway device. The sensor(s) can also provide information relating to the performance or condition of one or more components of the door closer, such as the operation of a backcheck mechanism, as well as tracking the number of door cycles. Information obtained by the sensor(s) of the door closer system can be communicated to a lockset device of an entryway control system. The lockset device can be configured to communicate information received from the door closer system to an access control system, which can in turn provide the communicated information to a management system.

19 Claims, 5 Drawing Sheets

Related U.S. Application Data (60) Provisional application No. 62/337,057, filed on May 16, 2016.

(51) Int. Cl.
  *E05F 15/40* (2015.01)
  *E05F 15/70* (2015.01)
  *G07C 9/00* (2020.01)
  *H04W 12/08* (2009.01)

(52) U.S. Cl.
  CPC ........ *G07C 9/00174* (2013.01); *H04W 12/08* (2013.01); *E05Y 2400/50* (2013.01); *G07C 2209/62* (2013.01)

(56) References Cited

U.S. PATENT DOCUMENTS

| | | |
|---|---|---|
| 6,714,118 B1 | 3/2004 | Frolov et al. |
| 7,449,856 B2 | 11/2008 | Valencia et al. |
| 7,571,515 B2 | 8/2009 | Fischbach et al. |
| 8,325,039 B2 | 12/2012 | Picard et al. |
| 8,407,937 B2 | 4/2013 | Houser |
| 8,564,235 B2 | 10/2013 | Burris et al. |
| 8,922,370 B2 | 12/2014 | Picard et al. |
| 9,121,217 B1 | 9/2015 | Hoffberg |
| 2003/0167693 A1 | 9/2003 | Mainini |
| 2004/0239496 A1 | 12/2004 | Fitzgibbon |
| 2010/0242368 A1 | 9/2010 | Yulkowski |
| 2011/0016971 A1 | 1/2011 | Yulkowski et al. |
| 2011/0252597 A1 | 10/2011 | Burris et al. |
| 2015/0330140 A1 | 11/2015 | Kincaid et al. |

OTHER PUBLICATIONS

International Written Opinion; International Searching Authority; International Patent Application No. PCT/US2017/032639; dated Aug. 1, 2017; 7 pages.

Supplementary European Search Report; European Patent Office; European Application No. 17799941.4; Jan. 9, 2020; 8 pages.

DOOR CLOSER COMMUNICATION

CROSS REFERENCE TO RELATED APPLICATIONS

The present application is a continuation of U.S. application Ser. No. 15/594,963 filed May 15, 2017 and issued as U.S. Pat. No. 10,047,551, which claims the benefit of U.S. Provisional Patent Application Ser. No. 62/337,057 filed May 16, 2016, the contents of each application incorporated herein by reference in their entirety.

BACKGROUND

Embodiments of the present application generally relate to communication of information by components of entryway devices. More particularly, but not exclusively, embodiments of the present application relate to the communication of information relating to the operation of a door closer system.

Door closers including, but not limited to, automatic door openers, are often utilized to provide a force or other action that at least assists in the displacement of an entryway device from an open position to a closed position. Moreover, a door closer can provide a force that at least assists in the displacement of an entryway device such as, for example, a door, gate, or barrier, among other devices, relative to a position at which the entryway device inhibits or prevents ingress and/or egress through a passageway. Thus, door closers can be structured to automatically return an opened entryway device to a closed position, and thereby remove the need for manual closing by a user. According to certain designs, door closers can be configured to limit the force at which the entryway device strikes at least the door frame when being displaced to the closed position, and/or to control the speed at which the entryway device is displaced to the open position and/or the closed position.

BRIEF SUMMARY

An aspect of the present application is directed to a door closer system for an entryway device. The door closer system includes a door closer that is structured to be coupled to the entryway device. The door closer system includes at least one sensor that is coupled to the door closer. The at least one sensor is configured to sense at least one of the following: (a) a position of the door closer or the entryway device, and (b) a speed of displacement of at least a portion of the door closer or the entryway device. The door closer system also includes a connecting device in communication with the at least one sensor, with the connecting device configured to transmit information detected by the at least one sensor.

Another aspect of the present application is directed to an entryway control system for the operation of an entryway device. The entryway control system includes a lockset device that has a lock mechanism and a lockset connecting device. The lock mechanism is adapted to lock and unlock the entryway device at a closed position. The entryway control system also includes a door closer system having a door closer, at least one sensor, and a lockset connecting device. The door closer is structured to be coupled to the entryway device, and the closer connecting device is adapted to transmit information sensed by the at least one sensor relating to the operation of the door closer system to the lockset connecting device.

Another aspect of the present application is directed to a method for communication of information relating to the operation of a door closer. The method includes sensing, by one or more sensors, one or more operating characteristics of the door closer, and with the one or more sensors being coupled to the door closer. The method also includes communicating the sensed one or more operating characteristics of the door closer to a lockset device, with the lockset device having a lock mechanism. Additionally, the lockset device communicates the sensed one or more operating characteristics of the door closer to an access control system.

BRIEF DESCRIPTION OF THE DRAWINGS

The description herein makes reference to the accompanying figures wherein like reference numerals refer to like parts throughout the several views.

The foregoing summary, as well as the following detailed description of certain embodiments of the present invention, will be better understood when read in conjunction with the appended drawings. For the purpose of illustrating the invention, there is shown in the drawings, certain embodiments. It should be understood, however, that the present invention is not limited to the arrangements and instrumentalities shown in the attached drawings.

DESCRIPTION OF THE ILLUSTRATED EMBODIMENTS

Certain terminology is used in the foregoing description for convenience and is not intended to be limiting. Words such as "upper," "lower," "top," "bottom," "first," and "second" designate directions in the drawings to which reference is made. This terminology includes the words specifically noted above, derivatives thereof, and words of similar import. Additionally, the words "a" and "one" are defined as including one or more of the referenced item unless specifically noted. The phrase "at least one of" followed by a list of two or more items, such as "A, B or C," means any individual one of A, B or C, as well as any combination thereof.

Figure 1:
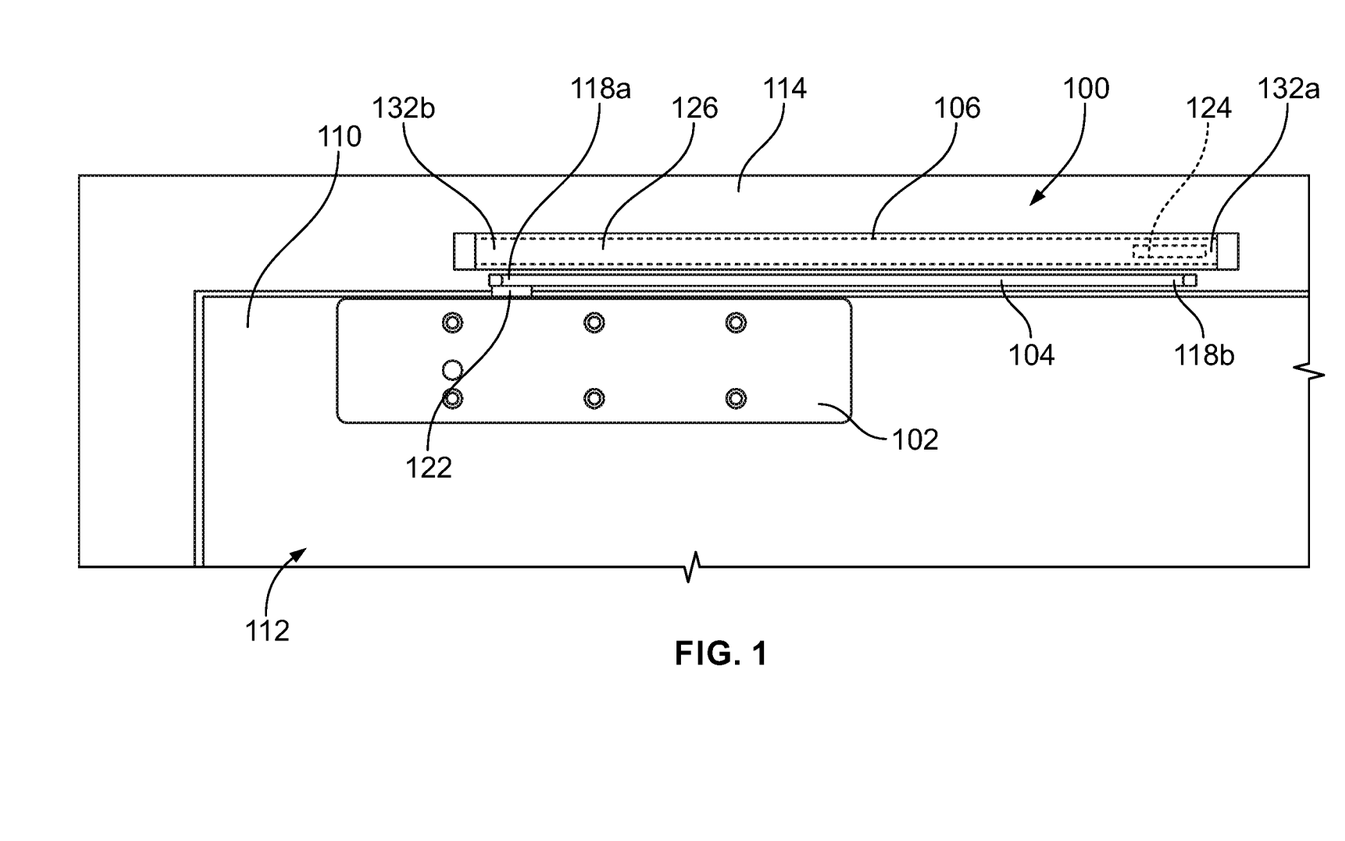
FIG. 1 illustrates a front view of an exemplary door closer positioned on an entryway device and adjacent a frame or wall.
Figure 2:
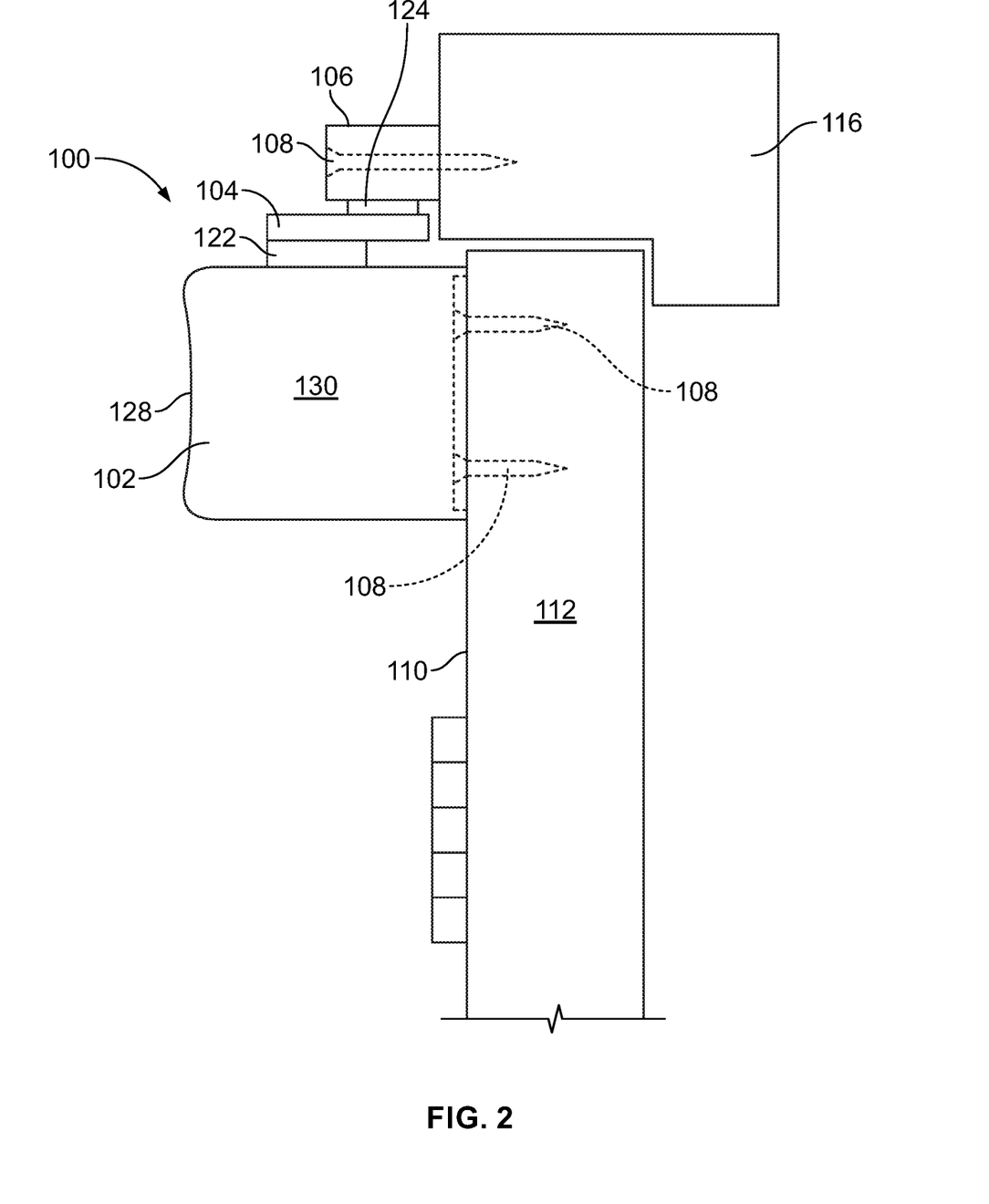
FIG. 2 illustrates a side cutaway view of the exemplary door closer, entryway device, and frame or wall shown in FIG. 1.

Embodiments of the present application can be utilized with a variety of types and/or configurations of door closers including, but not limited to, door closers used with entryway devices such as, for example, doors that generally swing or slide between open and closed positions. For example, FIGS. 1 and 2 provide one example of a door closer 100 that, among other door closers, can be utilized with embodiments of the present application and which is configured for use with at least entryway devices 112 that swing between open and closed positions. The door closer 100 depicted in FIGS. 1 and 2 includes a closer body 102, a closer arm 104, and a slide channel 106. The closer body 102 and the slide channel 106 can be mounted via use of a mechanical fastener(s) 108, including screws, bolts, or pins, among other mechanical fasteners 108, at a variety of different locations. For example, according to the illustrated embodiment, at least one of the closer body 102 and the slide channel 106 can be mounted to an outer surface 110 of the entryway device 112 while the other of the closer body 102 and the slide channel 106 can be mounted to a door frame 114 or a portion of a wall 116 positioned proximately adjacent to the entryway device 112 or door frame 114. Alternatively, according to certain embodiments, rather than being mounted on, or otherwise coupled to or extending from, an outer surface of the entryway device 112, the door frame 114, and/or the wall 116, the closer body 102 and/or slide channel 106 can be at least partially concealed or recessed within the entryway device 112, the door frame 114, and/or the wall 116.

According to the illustrated exemplary embodiment, a first end 118a of the closer arm 104 can be operably coupled to the closer body 102 such as, for example, by a first coupler, including a pin, post, or bolt, among other connections. According to certain embodiments, the first end 118a of the closer arm 104 can be pivotally coupled to a backcheck mechanism or valve 120 (FIG. 4) that can be at least partially housed in, or coupled to, the closer body 102. For example, according to the depicted embodiment, an upper portion 122 of the closer body 102 can extend outside of the closer body 102 and be used in connection with operably coupling the first end 118a of the closer arm 104 to a pinion or other mechanism that is used in connection with facilitating movement of hydraulic fluid within the backcheck mechanism 120, or which otherwise is involved in the operation of the backcheck mechanism 120. Moreover, a variety of different types of backcheck mechanism 120 can be utilized with embodiments of the present application. For example, according to certain embodiments, the backcheck mechanism 120 can be of the hydraulic type that can incorporate, for example, valves and passageways to control the flow of hydraulic fluid in a manner that can control the speed at which the entryway device 112 can be displaced, among other types of hydraulic backcheck mechanisms. Alternatively, according to other embodiments, the backcheck mechanism 120 could be a fluidless type of backcheck mechanism that can incorporate a biasing element that can at least assist in controlling the speed at which the entryway device 112 can be displaced from an open position to a closed position, or vice versa.

A second end 118b of the closer arm 104 is pivotally coupled to a slide 124 that is configured for displacement along a channel or track 126 in the slide channel 106. For example, according to certain embodiments, the second end 118b is pivotally coupled to the slide 124 in a manner that allows both rotational and linear displacement of the closer arm 104 relative to slide channel 106 as the slide 124 is at least linearly displaced along the channel or track 126 in the slide channel 106. The second end 118b of the closer arm 104 can be pivotally coupled to the slide 124 in a variety of different manners including, for example, by a pin, post, projection, or bolt, or among other connections. According to certain embodiments, the closer arm 104 can include one arm segment. However, according to other embodiments, the closer arm 104 can include two or more arm segments. For example, according to certain embodiments, the closer arm 104 can include two arm segments, with one arm segment having the first end 118a that is pivotally coupled to the closer body 102, and the other arm segment having the second end 118b that is pivotally coupled to the door frame 114 or a portion of the wall that is positioned adjacent to and/or generally defines at least a portion of the entryway. According to such an embodiment, adjacent ends of the arm segments of the closer arm 104 other than the discussed first and second ends 118a, 118b can be pivotally coupled together.

Figure 4:
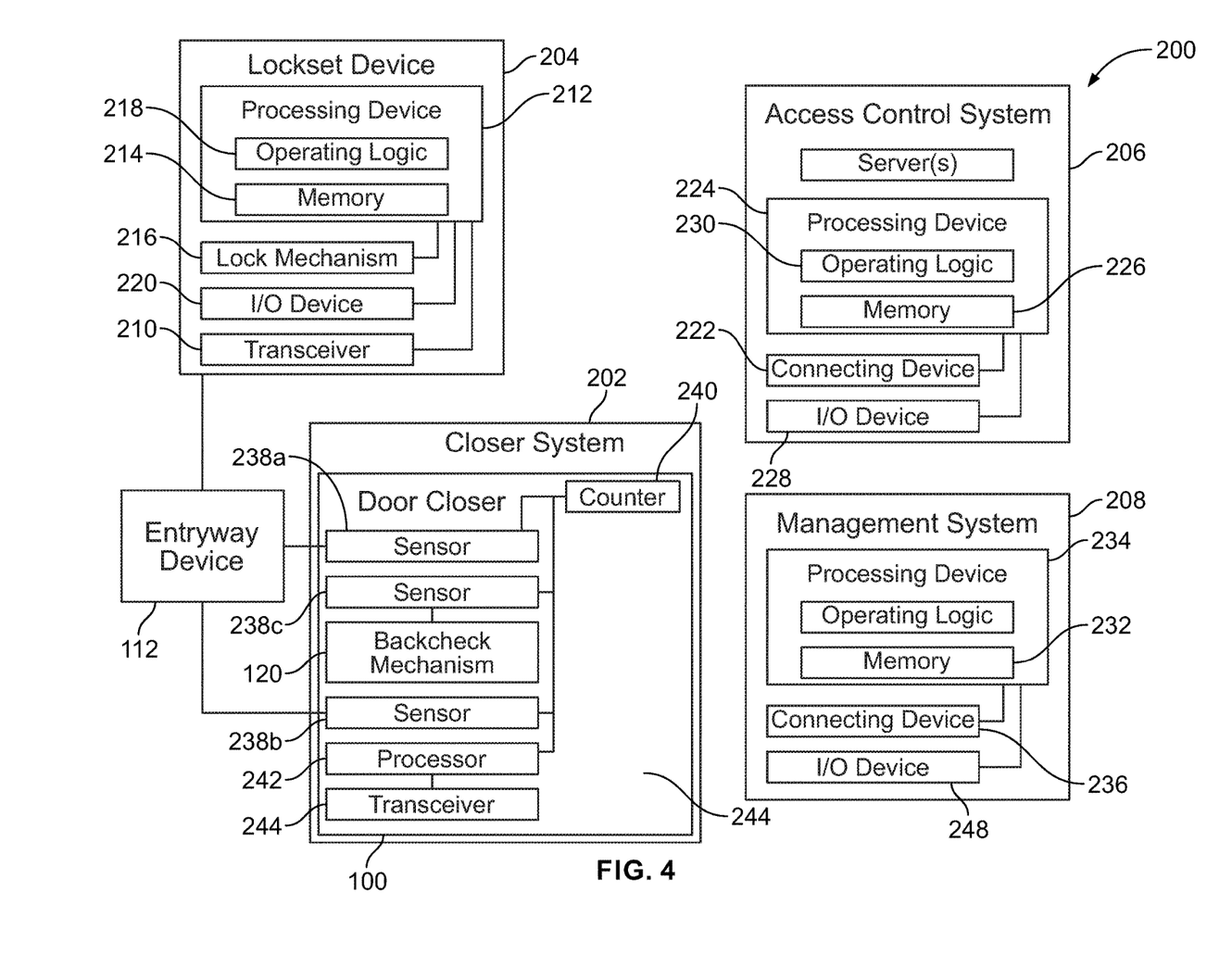
FIG. 4 illustrates a block diagram of an entryway control system according to an illustrated embodiment of the present application.

The closer body 102 can include an outer wall 128 that generally defines an inner region 130 of the closer body 102. Further, according to certain embodiments, at least a portion of the closer body 102, and more specifically at least a portion of the outer wall 128, can be covered by a cover (not shown) such as, for example, an ornamental cover. The inner region 130 of the closer body 102 can be sized to house one or more components that can be used in controlling operation of the door closer 100 including, for example, the backcheck mechanism or valve 120 (FIG. 4).

When the entryway device 112 is displaced from a closed position to an open position such as, for example, by user force or activation of an electric motor, the first end 118b of the closer arm 104 can pivot about the closer body 102 such as, for example, about the backcheck mechanism 120 in a first direction. Further, in the illustrated example, the entryway device 112 is displaced away from the closed position, and the slide 124 can be at least linearly displaced along the slide channel 106 from or about a first end 132a of the slide channel 106 toward a second end 132b of the slide channel 106. As the slide 124 is displaced along the slide channel 106, the second end 118b of the closer arm 104 can pivot relative to the slide channel 106 in a first direction.

Conversely, when the entryway device 112 is displaced from the open position to the closed position, the first end 118a of the closer arm 104 can pivot about the closer body 102 and/or the backcheck mechanism 120 in a second direction that is opposite the first direction. Further, as previously discussed, the backcheck mechanism 120 can control or otherwise influence the speed at which the entryway device 112 is displaced, at least as the entryway device 112 returns to the closed position. Similarly, as the entryway device 112 is displaced back to, or toward, the closed position, the slide 124 can be at least linearly displaced along the slide channel 106 from or about the second end 132b of the slide channel 106 toward, or to, the first end 132a of the slide channel 106. As the slide 124 is displaced along the slide channel 106, the second end 118b of the closer arm 104 can pivot relative to the slide channel 106 in a second direction opposite the first direction such that the second end 118b is pivoted when the entryway device 112 is displaced toward the open position.

While embodiments illustrated herein may be discussed in terms of door closers 100 having closer bodies 102 that are mounted to the entryway device 112, and which include an end of the closer arm 104 that is operably coupled to the door frame 114 or wall, the present application is also applicable to embodiments in which the closer body 102 is mounted to the door frame 114 or wall, and an end of a closer arm 104 is operably coupled to the entryway device 112. Additionally, as previously discussed, embodiments of the present application are also applicable to door closers used with entryway devices 112 that slide between open and closed positions including, but not limited to, sliding doors having an auto-operator, among other types of sliding doors.

Figure 3:
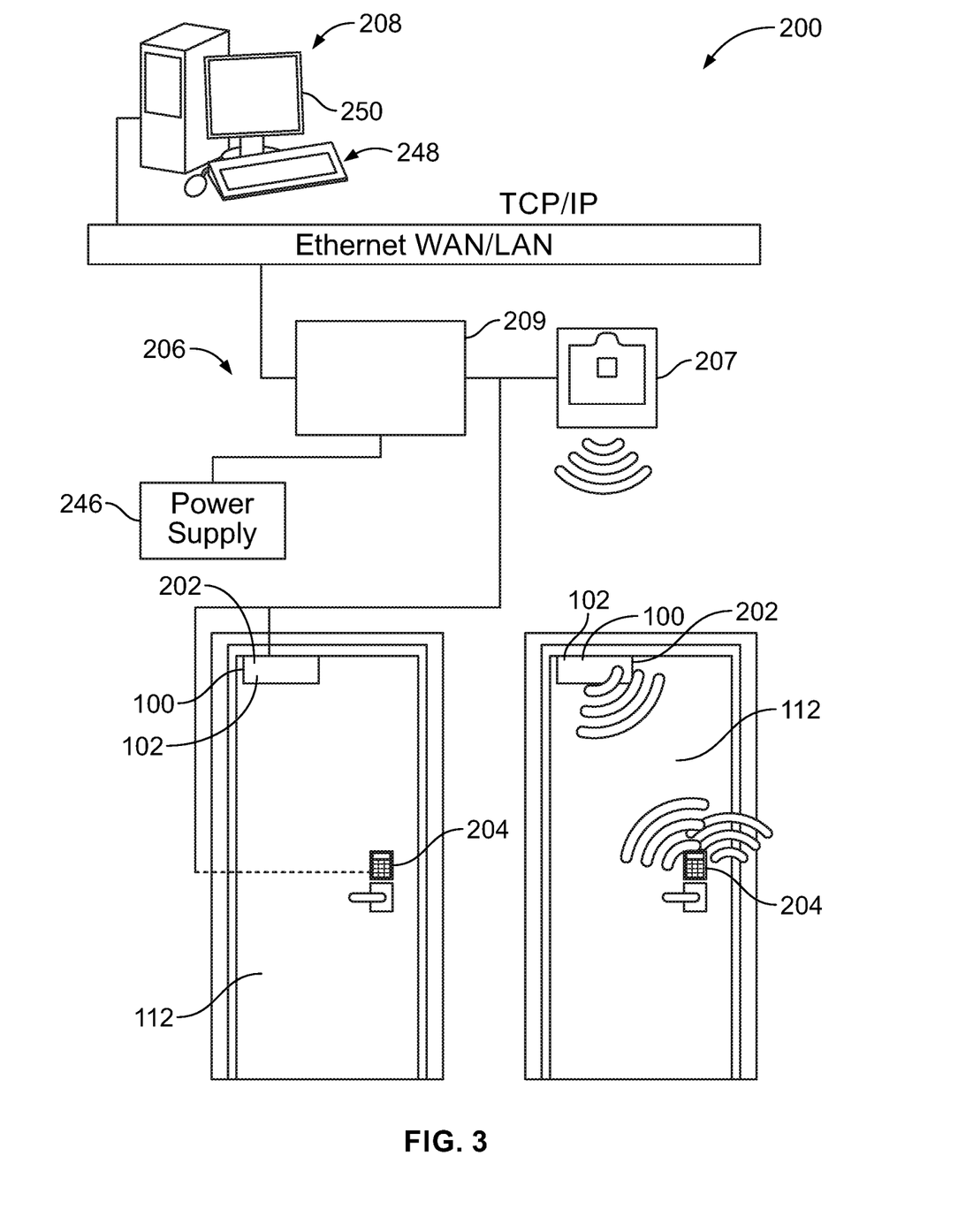
FIG. 3 illustrates a schematic depiction of an entryway control system according to an illustrated embodiment of the present application.

FIGS. 3 and 4 illustrate schematic diagrams of an exemplary entryway control system 200 that includes a door closer system 202, one or more lockset devices 204, an access control system 206, and a management system 208, according to an illustrated embodiment of the present application. While FIGS. 3 and 4 illustrate an exemplary entryway control system 200, one or more components shown in FIGS. 3 and 4 can be eliminated and/or replaced by other components. For example, while the exemplary entryway control system 200 is illustrated as including an access control system 206, according to other embodiments, the access control system 206 can be eliminated from the system 200 and/or the function of the access control system 206 can be performed by other components such as, for example, by the management system 208.

The lockset device 204 can be a lock, a reader device, a payment terminal, or combination thereof, among other types of devices that can communicate with the access control system 206. The entryway control system 200 can at least control the ability to open the entryway device 112 from a locked, closed position to an unlocked, open position so as to allow passage through, or access to, the associated passageway or portal.

In the embodiment shown in FIG. 4, the lockset device 204 is an electronic lock device having one or more transceivers 210, a processing device 212, a memory 214, and a lock mechanism 216 such as, for example, a bolt and/or a latch. A variety of different types of processing devices 212 can be used for the lockset device 204 such as, for example, a programmable, dedicated, and/or hardwired state machine, or any combination thereof. The processing device 212 of the lockset device 204 can further include multiple processors such as, for example, Arithmetic-Logic Units (ALUs), Central Processing Units (CPUs), Digital Signal Processors (DSPs), or the like. Processing devices 212 with multiple processing units can also utilize distributed, pipelined, and/or parallel processing. The processing device 212 can also be dedicated to the performance of just the operations described herein, or can be utilized in one or more additional applications. In the depicted form, the processing device 212 is of a programmable variety that executes algorithms and processes data in accordance with operating logic 218 as defined by programming instructions (such as software or firmware) stored in the memory 214 of the lockset device 204. Alternatively or additionally, the operating logic 218 is at least partially defined by hardwired logic or other hardware. The processing device 212 of the lockset device 204 can include one or more components of any type suitable to process the signals received from an input/output device 220 of the lockset device 204 such as, for example, a keypad, or elsewhere, and to provide desired output signals. Such components can include digital circuitry, analog circuitry, or a combination of both.

The memory 214 of the lockset device 204 can be included with the processing device 212 and/or coupled to the processing device 212. Further, the memory 214 can be of one or more types, such as a solid-state variety, electromagnetic variety, optical variety, or a combination thereof. Additionally, the memory 214 can be volatile, nonvolatile, or a combination thereof, and some or all of the memory 214 can be of a portable variety, such as a disk, tape, memory stick, cartridge, or the like. In addition, according to certain embodiments, the memory 214 can store data that is manipulated by the operating logic 218 of processing device 212, such as data representative of signals received from and/or sent to the input/output device 220 in addition to, or in lieu of, storing programming instructions defining the operating logic 218.

The memory 214 may be part of the processing device 212. Further, according to certain embodiments, the lockset device 204 can include one or more transceivers 210 configured for communication with the door closer system 202, the access control system 206, and/or the management system 208 using one or more wireless protocols or data streams such as, for example, an RS-485 data stream, among others. Further, as depicted in FIG. 3, rather than utilizing wireless connections, according to certain embodiments, the access control system 206 and/or the management system 208 can be hardwired to either or both of the door closer system 202 and the lockset device 204.

A variety of different types, arrangements and/or configurations of devices can be utilized to provide the access control system 206. For example, according to certain embodiments, the access control system 206 can include one or more servers that can communicate with the lockset device 204 in a variety of different manners including, for example, over a wide area network (WAN) (e.g., the Internet), a cellular data network, a local area network (LAN), or any combination thereof. According to certain embodiments, the access control system 206 includes a cloud-based server. However, a variety of other different types of servers can also be used for the access control system 206 including, for example, a web-based server. According to other embodiments, the access control system 206 can be an access control panel (ACP). Further, according to certain embodiments in which the access control system 206 is an ACP, the ACP can be located at a local location relative to the location of one or more of the lockset devices 204 such as, for example, at or within the same building or in an adjacent structure. Alternatively, according to other embodiments in which the access control system 206 is an ACP, the access control system 206 can be positioned at other locations such as, for example, in buildings or facilities that are remote from the building or facilities at which one or more of the lockset devices 204 are located.

Additionally, according to certain embodiments, the access control system 206 can include a network device or communication module 207 configured for communication with the lockset device 204 using one or more wireless protocols, while also being communicatively connected to the management system 208 in another manner and/or via use of another communication protocol. For example, referencing FIG. 3, according to certain embodiments, the access control system 206 can include a communication module 207 such as, for example, a gateway, router, and/or panel interface module (PIM), including a PIM 485 from ALLEGION®. The communication module 207 can be configured to communicate with the lockset device 204 via one or more wireless protocols including, for example, via WIFI, Bluetooth, Bluetooth lower energy (BLE), and/or over a variety of radio frequencies including, but not limited to, 900 MHz, among other wireless communication protocols. Additionally, as shown in FIG. 3, the communication module 207 can be configured to communicate with the management system 208 such as, for example, via the use of the control panel 209 and via an RS-485 data stream, or IP output, among other manners or protocols of communication.

The access control system 206 can be configured to perform a variety of different operations including, for example, maintenance and/or management of the entryway control system 200, the lockset device 204, and/or the door closer system 202. Thus, the access control system 206 can be configured to store a variety of different types of information including, for example, user lists, access logs, and/or access permissions for each user and/or credential device including, for example, access permission or other authorization associated with a credential device or identifier. The access control system 206 can further include non-transitory computer executable instructions to perform various operations in the form of an application. The various operations can include, but are not limited to, functionality to manage the lockset device 204, verifying access permissions received from the credential devices at each lockset device 204, updating the access control system 206 user lists, access permissions, and adding and/or removing lockset devices 204 for/from the entryway control system 200, among other operations. For purposes of at least illustration, according to certain embodiments, such management and maintenance functionality of the access control system 206 can be at least partially performed through the use of an access control panel 209, among other controllers or control modules.

The access control system 206 can include one or more connecting devices 222, a processing device 224, a memory 226, and an input/output device 228. Similar to the lockset device 204, a variety of different types of processing devices 224 can be used for the access control system 206 such as, for example, a programmable, dedicated, and/or hardwired state machine, or any combination thereof. The processing device 224 of the access control system 206 can also include one or more processors such as, for example, Arithmetic-Logic Units (ALUs), Central Processing Units (CPUs), Digital Signal Processors (DSPs), or the like. Processing devices 224 with multiple processing units can also utilize distributed, pipelined, and/or parallel processing. The processing device 224 of the access control system 206 can also be dedicated to performance of just the operations described herein or can be utilized in one or more additional applications. In the depicted form, the processing device 224 of the access control system 206 is of a programmable variety that executes algorithms and processes data in accordance with operating logic 230 as defined by programming instructions (such as software or firmware) stored in the memory 226 of the access control system 206. Alternatively or additionally, the operating logic 230 can be at least partially defined by hardwired logic or other hardware. The processing device 224 of the access control system 206 can include one or more components of any type suitable to process the signals received from the input/output device 220 of the lockset device 204 such as, for example, a keypad, and to provide desired output signals. Such components can include digital circuitry, analog circuitry, or a combination of both.

The memory 226 of the access control system 206 can be included with the processing device 224 and/or coupled to the processing device 224. Further, the memory 226 can be of one or more types, such as a solid-state variety, electro-magnetic variety, optical variety, or a combination thereof. Additionally, the memory 226 can be volatile, nonvolatile, or a combination thereof, and some or all of the memory 226 can be of a portable variety, such as a disk, tape, memory stick, cartridge, or the like. In addition, according to certain embodiments, the memory 226 can store data that is manipulated by the operating logic 230 of the processing device 224, such as data representative of signals received from and/or sent to the input/output device 228 in addition to, or in lieu of, storing programming instructions defining the operating logic 230.

According to certain embodiments, the door closer system 204 can be in wired or wireless communication with one or more lockset devices 202. Additionally, each lockset device 204 and/or door closer system 202 can be hardwired to the access control system 206, thereby allowing for communications between the access control system 206 and the lockset device(s) 204 and/or door closer system(s) 202 to occur via the wired connection. Alternatively, according to other embodiments, at least some, if not all, of the lockset device(s) 204 and/or door closer system(s) 202 can communicate with the access control system 206 via a wireless connection or communication protocol. Thus, according to certain embodiments, one or more of the connective devices 222 of the access control system 206 can communicate with one or more lockset device(s) 204 and/or door closer system(s) 202 via a wireless connection, while other lockset device(s) 204 and/or door closer system(s) can communication with the access control system 206 via a wired connection. A variety of different types of connecting device(s) 222 can be utilized for wireless communication between the access control system 206 and the lockset devices 204 and/or door closer systems 202. For example, according to certain systems, at least some of the connecting devices 222 can be configured as a transceiver or a communication panel such as, for example, an RS-485 interface panel.

Additionally, one or more of the connecting devices 222 of the access control system 206 can be configured for communicating with the management system 208. A variety of different types of devices can be utilized as a connecting device 222 for connecting to the management system 208 including, for example, a gateway, bridge, router, or switch, among other devices. The management system 208 can include any type of computing device such as, for example, a laptop or desktop computer, or a mobile electronic device, among other computing devices, that includes a memory 232 and a processor 232 sufficient in size and operation to store and manipulate a database and one or more applications for communicating with the access control system 206. In certain embodiments, the management system 208 can include a connecting device 236 that can communicate with a connecting device 222 of the access control system 206 via an Ethernet WAN/LAN connection. In certain other embodiments, the management system 208 can include a web server, or web portal, and/or can communicate with the connecting device 222 via the internet.

The door closer system 202 includes the door closer 100, one or more system sensors 238*a-c* configured to at least sense information regarding the operation of the door closer 100 and/or the entryway device 112. For example, according to certain embodiments, the door closer system 202 can include one or more positional sensors 238*a* that detect the general position of at least a portion of the door closer 100, and thus the position of the entryway device 112. The door closer system 202 can also include one more sensors 238*b* that detect a speed of the closer body 102 and/or the entryway device 112. According to such an embodiment, displacement of the closer body 102 and/or the entryway device 112, and the speed of such displacement between the closed and open positions, can be sensed by the sensor 238*a*, 238*b*. According to certain embodiments in which the closer body 102 is mounted to the entryway device 112, the positional and speed sensors 238*a*, 238*b* can be positioned on or within the closer body 102 or the entryway device 112. Additionally, according to the illustrated embodiment, the door closer system 202 can include a counter 240 configured to track the number of times the entryway device 112 has been displaced to, or away from, open and/or closed positions, which is also referred to as door cycles or cycling. Further, according to certain embodiments, the counter 240 can utilize information provided by the position sensor 238*a* and/or the speed sensor 238*b* in determining or tracking the occurrence of a door cycle. Alternatively, the counter 240 can be part of other components of the entryway control system 200 such as, for example, the lockset device 204, the access control system 206, and/or the management system 208.

According to certain embodiments, one or more system sensors 238c can include sensors relating to the operation and/or the condition of the backcheck mechanism 120. For example, the door closer system 202 can include one or more sensors 238c that provide information regarding the location or position of one or more components of the backcheck mechanism 120 and/or a pressure level of the backcheck mechanism 120. Further, while examples of certain sensors are provided, a wide range of sensors can be utilized by the door closer system 202 including, for example, a temperature sensor that senses the temperature of the door closer system 202, and a sensor that detects attempts to tamper with the door closer system 202. Further, according to certain embodiments, the system sensors 238a-c of the door closer system 202 can be part of a wireless sensor network (WSN) that comprises a group of specialized transducers that have sensor, processing, and transmission capabilities.

The door closer system 202 can be further configured to communicate information from the one or more system sensors 238a-c and/or counter 240 to the lockset device 204, the access control system 206, and/or the management system 208. For example, according to the illustrated embodiment, the door closer system 202 can further include a processor 242 and/or memory that can store and/or interpret information provided by the system sensors 238a-c, as well as output related signals for transmission to the transceiver 210 of the lockset device 204 and/or to the access control system 206. For example, as shown by FIG. 4, according to the illustrated embodiment, the processor 242 can output signals to a connecting device including, but not limited to, a transceiver 244 that communicates with the transceiver 210 of the lockset device 204. According to such an embodiment, information provided to the lockset device 204 by the door closer system 202 can be communicated to the access control system 206 via the transceiver 210 of the lockset device 204.

Components of the door closer system 202 can be provided with electrical power, if necessary, in a variety of different manners. For example, according to certain embodiments, components of the door closer system 202 such as, for example, the system sensors 238a-c, processor 242, and/or transceiver 244, can receive power from a power supply 246 (FIG. 3) such as, for example, via a wired connection. Such a power supply 246 can also provide power to other components of the entryway control system 200 including, for example, the access control system 206 and/or the lockset device 204. According to other embodiments, the power supply 246 can be provided as a battery housed in the closer body 102 or located remote from the closer body 102.

Figure 5:
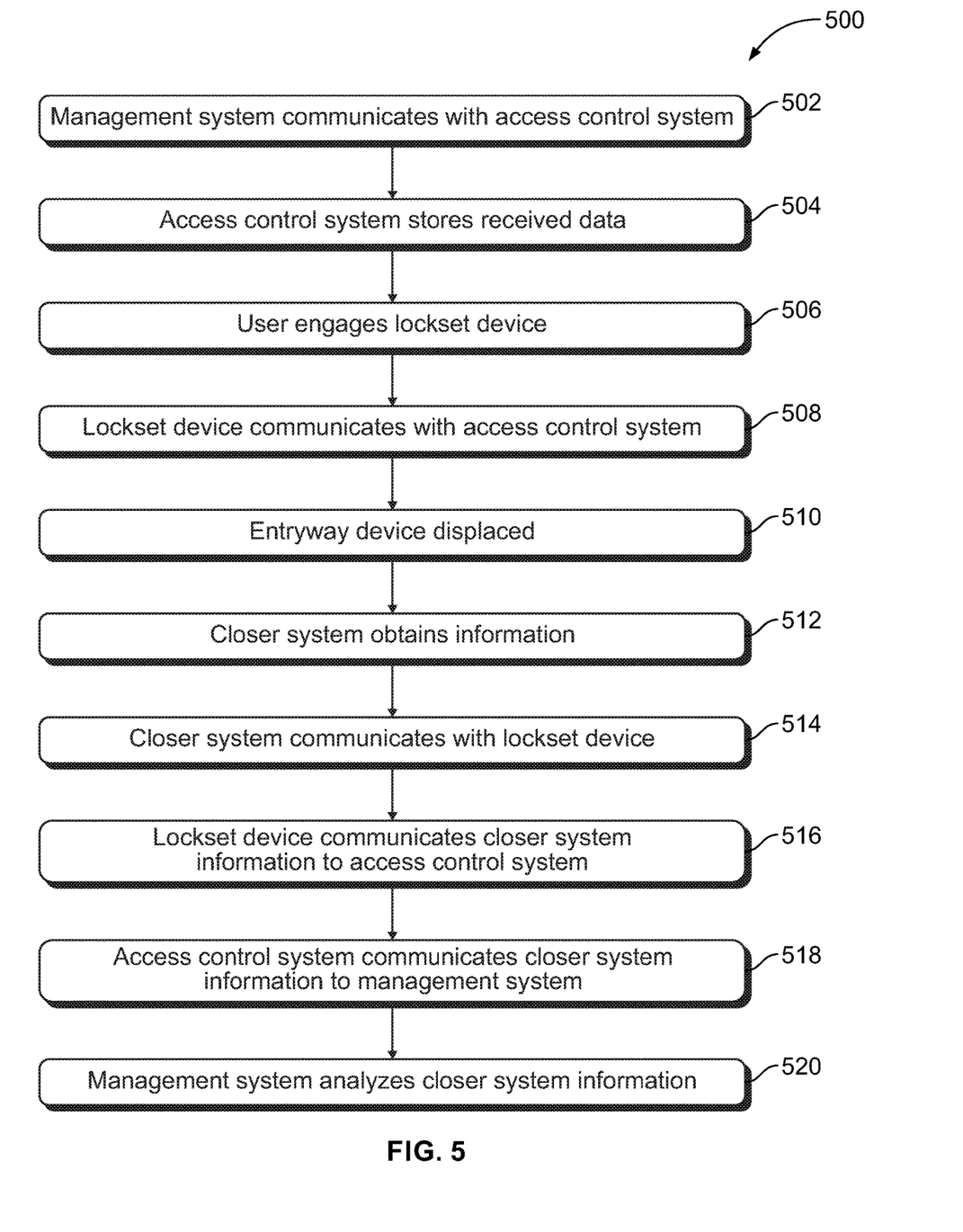
FIG. 5 illustrates a schematic flow diagram of an exemplary process of operation of an entryway control system according to an illustrated embodiment of the present application.

FIG. 5 illustrates a schematic flow diagram of an exemplary process 500 for operation of the entryway control system 200. The operations illustrated for all of the processes in the present application are understood to be exemplary only, and operations can be combined or divided, and added or removed, as well as re-ordered in whole or in part, unless explicitly stated to the contrary. At step 502, the management system 208 can communicate information to the access control system 206 and/or the lockset device 204 indicating user or credential information permission to unlock a closed and locked entryway device 112. At step 504, the access control system 206 and/or the lockset device 204 can store the received information from the management system 208 such as, for example, storing received data on a memory 226 of the access control system 206 and/or the memory 214 of the lockset device 204.

At step 506, a user can engage an input/output device 220 of the lockset device 204 so as to unlock the lockset device 204. For example, at step 506, the user can present a card, badge, or other credential device to a reader or sensor of the lockset device 204 and/or can enter a password in a keypad of the lockset device 204. At step 508, the lockset device 204 can communicate information or data identifying the lockset device 204 and/or the authority of the lockset device 204 to at least establish communication with the access control system 206 and/or the management system 208. Thus, according to certain embodiments, such communication from the lockset device 204 can be provided to the access control system 206, which can in turn communicate the information to the management system 208. Alternatively, according to other embodiments, including embodiments in which the entryway control system 200 does not include an access control system 206, such communication from the lockset device 204 can be provided to the management system 208. According to certain embodiments, the data communicated by the lockset device 204 can include data, including encrypted data, which is used to verify the identity of the lockset device 204 and/or indicate the authority of the lockset device 204 to transmit and/or receive information to/from the access control system 206 and/or the management system 208. According to certain embodiments, the data communicated by the lockset device 204 to the access control system 206 and/or the management system 208 can include information provided by the user and/or the credential device such as, for example, information used in determining whether the user has authority to lock and/or unlock the lock mechanism 216. If the user or credential is authorized, the lockset device 204 can accommodate the unlocking of the lock mechanism 216 and/or the displacement of the associated entryway device 112. Accordingly, at step 510, the entryway device 112 can be displaced from the locked/closed position to the unlocked/open position before returning from the open position to the closed position.

At step 512, the door closer system 202 can detect, determine, or otherwise obtain information relating to the operation of the door closer system 202 and/or entryway device 112. As previously discussed, the door closer system 202 can be utilized to attain a variety of different types of information. For example, the door closer system 202 can be utilized to obtain information regarding the conditions and/or operation of the door closer system 202 and/or entryway device 112, including information sensed by the system sensors 238a-c, as previously discussed, among other information. Such information can include, but is not limited to, the speed of one or more components of the door closer system 202 and/or of the entryway device 112 as the entryway device 112 is displaced from the open position to the closed position and/or from the closed position to the open position, the position of the entryway device 112, the condition, operation, and/or settings of the backcheck mechanism 120, the number of times the entryway device 112 has been displaced from, or to, the open and/or closed positions, and/or the temperature within the door closer system 202, among other types of information or data.

According to the illustrated embodiment, information from the door closer system 202 can be communicated to the lockset device 204 at step 514. Such communication from and/or between the door closer system 202 and the lockset device 204 can occur at a variety of different times. For example, such communication from the door closer system 202 can occur upon, during, and/or after one or more events such as, for example, detection of the entryway device 112 being displaced from at least one of the closed and open positions to the other of the closed and opened positions. Further, such communication can occur upon or after detection of movement and/or operation of the door closer system 202 and/or the entryway device 112. Further, such communication can occur at predetermined time periods or time intervals. Alternatively, such communication can occur upon the counter 240 reaching a certain threshold, or attaining a certain level within a particular time period. Additionally, according to other embodiments, such communication from the door closer system 202 can occur upon a sensed temperature being outside of a particular value such as, for example, exceeding a generally typical or expected operating temperature range. Additionally, according to certain embodiments, in addition to the door closer system 202 communicating information from the door closer system 202 that can be utilized for the benefit of lock algorithms and/or for the lockset device 204 to communicate an access control solution, the lockset device 204 can communicate information to the door closer system 202 that can enhance operations of the door closer system 202. For example, the door closer system 202 can communicate information to the door closer system 202 that can be utilized to adjust at least one operating characteristic of the door closer system 202 such as, for example, to adjust the information being sensed by or derived from the sensors 238a-c and/or which can result in an adjustment in the backcheck mechanism 120, among other enhancements.

At step 516, the lockset device 204 communicates to the access control system 206 and/or the management system 208 information the lockset device 204 received from at least the door closer system 202. Moreover, the information communicated by the lockset device 204 can include information from the closer system 202, as well as information from other devices that are positioned around the entryway and which are communicatively coupled to the lockset device 204. Further, according to certain embodiments, information communicated from the lockset device 204 to the access control system 206 and/or the management system 208 can be indirect in that the communicated information can pass along other components of the system 200 before being communicated to the access control system 206 and/or the management system 208.

The actual timing of when the lockset device 204 communicates information from the door closer system 202 to the access control system 206 and/or the management system 208 can vary. For example, according to certain embodiments, in at least some situations, the lockset device 204 can communicate information from the door closer system 202 to the access control system 206 and/or the management system 208 in connection with operation of the lockset device 204. Further, according to certain embodiments, the lockset device 204 can determine whether the lockset device 204 has data from the door closer system 202 that the lockset device 204 has not yet communicated to the access control system 206 and/or the management system 208, and can then determine to communicate that information to the access control system 206 and/or the management system 208 at that time, at a later predetermined time, and/or upon the occurrence of a particular event. For example, according to certain embodiments, the lockset device 204 can communicate information the lockset device 204 receives from the door closer system 202 in connection with establishing whether a user has authority to unlock the lock mechanism 216, after a predetermined number of intervals of usage of operation of the lock mechanism 216, and/or during scheduled or unscheduled communication between the lockset device 204 and the access control system 206 and/or the management system 208. Such scheduled or unscheduled communications can include, for example, communications relating to inquiries regarding system updates, maintenance, and/or status checks between the lockset device 204 and the access control system 206 and/or the management system 208, among other events.

Alternatively, according to other embodiments, rather communicating information to the access control system 206 and/or the management system 208 through the lockset device 204, the door closer system 202 can be configured to transmit and/or receive information to/from the access control system 206 and/or the management system 208. Thus, according to certain embodiments, in addition to transmitting information regarding the operation and/or characteristics of the door closer system 202, the door closer system 202 can provide information indicating authority to communicate information to, and/or receive information from, the access control system 206 and/or the management system 208.

At step 518, according to certain embodiments, the access control system 206 can communicate to the management system 208 information received by the access control system 206 relating to the operation and/or characteristics of the door closer system 202. At step 520, the management system 208 can analyze information received from the door closer system 202, lockset device 204, and/or the access control system 206 relating to the operation and/or characteristics of the door closer system 202, and/or display corresponding information for a user of the entryway control system 200. However, according to certain embodiments, at least certain types of information provided to the management system 208 can have already been analyzed. For example, according to certain embodiments, the closer system 202, lockset device 204, and/or the access control system 206 can analyze information, or certain aspects of information, obtained by the closer system 202 and/or lockset device 204 before the information is provided to the management system 208. For example, according to certain embodiments, the processor 242 of the closer system 202 can be configured to identify diagnostic or prognostic events and communicate those identified events to other elements of the entryway control system 200. Such identification can provide an alternative manner of communicating maintenance needs of the closer system 202. Additionally, such an embodiment can provide a primary or redundant notification mechanism for communicating at least the maintenance needs of the closer system 202.

Additionally, according to certain embodiments, the management system 208 can determine whether information received at step 518 relates to the operation or characteristics of the door closer system 202 are outside of, or otherwise non-compliant with, a predetermined value or value range. Further, in the event the received information is outside a value or range of values and/or is otherwise non-compliant, the management system 208 can provide a corresponding notification to a user(s) of the entryway control system 200. For example, according to certain embodiments, the input/output device 248 of the management system 208 can include a monitor or display 250 (FIG. 3) upon which visual indicators such as, for example, indicators of certain operating parameters being outside of a particular range or value, or which indicate at least potential non-compliant usage of at least certain components of the door closer system 202, among other indicators, can be provided to the user of the management system 208. For example, according to certain embodiments, the management system 208 can determine, based on information provided by a sensor 238a or counter 240, whether the entryway device 112 is being displaced from a closed position to an open position an apparently excessive number of times and/or at unsuspected time periods, and can provide a visual and/or audible indication of such apparent excessive usage, such as via use of a monitor and/or speaker, among other devices. Further, the management system 208 can evaluate the number of times the entryway device 112 is being opened in determining when to schedule preventive maintenance such as, for example, maintenance for the door closer system 202, lockset device 204, and/or for the entryway device 112. Further, information detected by the sensor 238b regarding the speed at which the entryway device 112 is being opened and/or returning from a closed position to an open position can indicate whether the backcheck mechanism 120 is in need of adjustment, maintenance, and/or replacement.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law.

Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

The invention claimed is:

1. A method of operating an entryway control system for the operation of an entryway device, the entryway system comprising a door closer operable to move the entryway device and an access control device operable to selectively retain the entryway device in a closed position, the method comprising:
by the access control device, wirelessly receiving from the door closer information relating to one or more operating characteristics of the door closer as sensed by a sensor of the door closer; and
by the access control device, wirelessly transmitting the information relating to one or more operating characteristics to an access control system.

2. The method of claim 1, further comprising:
by the sensor of the door closer, generating the information relating to one or more operating characteristics; and
by a wireless transceiver of the door closer, transmitting to the access control device the information relating to one or more operating characteristics.

3. The method of claim 1, wherein the one or more operating characteristics comprises at least one of a position of a portion of the door closer or a displacement speed of the portion of the door closer.

4. The method of claim 1, further comprising transmitting, from the access control device to the door closer, instructions to adjust at least one of the one or more operating characteristics of the door closer.

5. The method of claim 4, further comprising, by the access control device, receiving the instructions from the access control system, wherein the transmitting the instructions is performed in response to the receiving the instructions.

6. The method of claim 1, wherein the access control device comprises a lockset device including a lock mechanism operable to selectively lock the entryway device in the closed position.

7. A method of operating an entryway control system for the operation of an entryway device, the entryway system comprising a door closer operable to move the entryway device, the method comprising:
by the door closer, generating information relating to at least one operating characteristic of the door closer;
by the door closer, wirelessly transmitting to an access control device, by a wireless transceiver, the information relating to at least one operating characteristic of the door closer;
by the door closer, wirelessly receiving instructions from the access control device, by the wireless transceiver, to adjust a selected operating characteristic of the at least one operating characteristic; and
by the door closer and in response to receiving the instructions, adjusting the selected operating characteristic according to the instructions.

8. The method of claim 7, wherein the access control device is operable to selectively retain the entryway device in a closed position.

9. The method of claim 7, wherein the access control device is a gateway of an access control system.

10. The method of claim 7, further comprising:
by the access control device, receiving the information relating to at least one operating characteristic of the door closer;
by the access control device, generating the instructions; and
by the access control device, transmitting the instructions to the door closer.

11. The method of claim 7, further comprising, by the access control device, transmitting to an external device the information relating to at least one operating characteristic of the door closer.

12. The method of claim 11, wherein an access control system comprises the external device.

13. The method of claim 7, wherein the at least one operating characteristic comprises at least one of:
a position of the door closer or the entryway device; and
a displacement speed of the door closer or the entryway device.

14. An entryway control system for the operation of an entryway device, the entryway control system comprising:
a door closer comprising a closer body, a sensor configured to detect an operating characteristic of the door closer, and a first wireless transceiver positioned in the closer body and configured to wirelessly transmit information relating to the operating characteristic; and
an access control device operable to control access through the entryway device, the access control device comprising a second wireless transceiver operable to receive the information relating to the operating characteristic;

wherein at least one of the access control device or the door closer is configured to wirelessly transmit the information relating to the operating characteristic to an external device.

15. The entryway control system of claim 14, wherein the access control device further comprises a lock mechanism operable to selectively lock the entryway device in a closed position.

16. The entryway control system of claim 14, wherein the access control device is configured to wirelessly transmit the information relating to the operating characteristic via the second wireless transceiver.

17. The entryway control system of claim 14, wherein the access control device is further configured to transmit to the door closer instructions pertaining to the operating characteristic; and wherein the door closer is configured to adjust the operating characteristic according to the instructions.

18. The entryway control system of claim 14, wherein each of the first wireless transceiver and the second wireless transceiver comprises at least one of a WIFI transceiver or a Bluetooth transceiver.

19. The entryway control system of claim 14, further comprising an access control system comprising the external device;

wherein the access control system is configured to transmit to the access control device instructions relating to operation of the door closer;

wherein the access control device is configured to transmit the instructions to the door closer; and wherein the door closer is configure to operate according to the instructions.

* * * * *